United States Patent [19]
Hill et al.

[11] 3,950,707
[45] Apr. 13, 1976

[54] QUANTUM AMPLIFIER HAVING PASSIVE CORE AND ACTIVE CLADDING PROVIDING SIGNAL GAIN BY INTERACTION OF EVANESCENT-WAVE COMPONENTS OF SIGNAL AND PUMP BEAMS PROPAGATING ALONG THE CORE

[75] Inventors: Kenneth O. Hill; Akira Watanabe; John G. Chambers, all of Kanata, Canada

[73] Assignee: Canadian Patents and Development Limited, Ottawa, Canada

[22] Filed: Apr. 13, 1973

[21] Appl. No.: 350,687

[52] U.S. Cl. .......... 330/4.3; 331/94.5 E; 350/96 WG
[51] Int. Cl.[2] .......................................... H01S 3/09
[58] Field of Search ................. 330/4.3; 332/7.51; 350/96 WG; 250/199; 331/94.5 P, 94.5 E

[56] References Cited
UNITED STATES PATENTS

| | | | |
|---|---|---|---|
| 3,571,737 | 3/1971 | Miller | 330/4.3 |
| 3,666,345 | 5/1972 | Maslowski | 350/3.5 |
| 3,700,303 | 10/1972 | Smith et al. | 350/3.5 |
| 3,725,810 | 4/1973 | Ashkin et al. | 331/94.5 |

OTHER PUBLICATIONS

Ippen et al., "An Evanescent Field Pumped Dye Laser", 2/10/72, PPTLA4-1 to 4, Opt. Soc. of Amer., Integrated Optics Meeting Technical Papers.
Watanabe et al., "Amplification of Light . . . Pumping", 4/1/73, pp. 761-771, Canadian Journal of Physics, Vol. 51, No. 7.
Hill et al., "Amplification of . . . Interactions", 10/7/71, p. 1579, Jour. Opt. Soc. of Amer., Vol. 61, No. 11.
Ippen et al., "Evanescent-Field Pumped Dye Laser", 10/1/72, pp. 301-302, A.P.L., Vol. 21, No. 7.
Koester, "Laser Action by . . . Reflection", 9/66, pp. 580-584, IEEE, J.Q.R., Vol. QR-2, No. 9.

*Primary Examiner*—T. H. Tubbesing
*Assistant Examiner*—N. Moskowitz
*Attorney, Agent, or Firm*—Lawrence E. Laubscher

[57] ABSTRACT

An optical amplifier particularly for use in a high data-rate fibre-optics communication link utilizing a body of a dielectric substance transparent to signal light of a given band of wavelengths and transparent also to pumping light of a different band of wavelengths, a smooth continuous surface along the length of the body having as amplifying component a layer of laser material adhered contiguous to the surface. Both signal light and pumping light are introduced into an end face of the body, which may be a passive dielectric fibre core such as glass, or a passive dielectric slab with parallel side walls, utilising mode order converting holograms. By the phenomenon of penetration by light of both frequencies within a thin layer of the adhered material as the light beams undergo multiple total internal reflections at the interface between the body and the laser material, atoms of active material, e.g. $Nd^{+3}$ or organic dye molecules in the laser medium are optically pumped to a higher energy level, and fluoresce and are stimulated by the evanescent-wave component of the signal light to coherently emit light in a band of wavelengths correlated with the signal band of wavelengths. The amplified signal light is delivered from the other end face, and is launched through further hologram devices in a transmission mode into a succeeding fibre or slab of the link.

4 Claims, 8 Drawing Figures

QUANTUM AMPLIFIER HAVING PASSIVE CORE AND ACTIVE CLADDING PROVIDING SIGNAL GAIN BY INTERACTION OF EVANESCENT-WAVE COMPONENTS OF SIGNAL AND PUMP BEAMS PROPAGATING ALONG THE CORE

This invention relates to light amplifying systems comprising a passive dielectric waveguiding body having a cladding layer of lower index of refraction than the body and wherein the layer includes dopants which are optically pumped to a predetermined higher energy level by light of pumping frequency propagating along the body in a selected mode or modes by multiple total internal reflections together with a signal beam propagating also therealong in a selected mode or modes, whereby a level of population inversion is attained in the penetrated portion of the layer sufficient to effect gain in signal beam level.

The invention is particularly concerned to provide improvement in the overall gain of a repeater stage in a high data-rate fibre-optics communication link by incorporating in the repeater stage an amplifier comprising an optical glass passive fibre core having a cladding of a laser medium, disposing a mode-matching hologram between the signal source and the entry end of the optical glass passive fibre core to direct incident signal light energy into the fibre in a selected mode such as the $HE_{11}$ mode, and simultaneously focussing into the end of the fibre a second light beam at a pumping frequency in a selected mode such that the beams propagate along the core by multiple total internal reflections from the interface between the layer and the core glass, and a net gain of the signal light energy is attained by interaction of evanescent-wave components of the signal beam with the optically-pumped region of the cladding.

FIELD OF THE INVENTION

It is known that in the process of total internal reflection of optical electromagnetic wave energy at an interface between a higher index dielectric waveguiding structure such as a glass fibre core and a lower index cladding layer, the depth of beam penetration into the lower index medium, i.e., the depth at which the attenuated beam is at the $1/e$ fraction of the incident intensity level, increases as the angle of incidence (measured from the normal to the reflecting surface) decreases, and that the penetration depth up to the critical angle does not exceed a few half-wavelengths. When the penetrated medium comprises an active cladding layer such as a liquid film, pumping energy may be applied efficiently at very high intensities to a very thin contiguous portion of the layer in which absorption occurs by propagating the pumping beam along the fibre as a bound mode of the waveguide structure. We have found that by suitably choosing the indices of refraction of the core and the cladding layer, and selecting the pumping frequency and propagation mode order number in relation to the signal frequency and signal mode order number and the dimensions of the waveguiding structure, and contiguous layer portion which is excited to a level of population inversion by the evanescent-wave component of the pumping beam will enhance the intensity of the signal beam at each reflection within the layer portion, achieving signal amplification with relatively high conversion efficiency.

It has been proposed heretofore by prior workers to pump an active medium cladding a passive optical glass fibre to achieve a reflection coefficient at the interface between the passive core and laser cladding greater than unity for a light beam carried by the core by total internal reflection. Such proposal utilized as pumping source an imaged flash tube disposed along the length of the core, capable of dissipating from several hundred to several thousand Joules of energy per meter length. The arrangement, however, proves in practice to be grossly inefficient from the standpoint of total energy consumed, the discontinuous application of pumping energy, the loss of pumping energy in traversing the active cladding layer portions not penetrated by any part of the signal beam; and the bulk of the apparatus per repeater stage. Moreover attempts to limit size by coiling up the glass fibre and its cladding to form a helical coil leads to further loss of potential gain due to alteration of propagation modes by curvature of the fibre. See "Laser Action by Enhanced Total Internal Reflection", Koester, C. J. IEEE Journal of Quantum Electronics, Vol. QE-2, No. 9, September 1966.

SUMMARY OF THE INVENTION

We have found that when optical pumping of the laser cladding medium is carried out employing coherent light delivered by a laser source propagating along a passive core in a pump mode of the waveguiding dielectric structure, signal modes also propagating along the core are amplified through evanescent wave component interactions within a contiguous zone of the cladding medium. Quantum amplifiers constructed to operate on this principle exhibit a high net gain coefficient, improving greatly over conventional methods wherein a pump beam is focussed into the laser material and the signal beam is propagated within the optically pumped region. According to the invention, small to moderate interaction lengths of amplifier prove to be realizeable with known passive dielectrics and laser cladding materials.

It will be useful at this point to clarify the expressions "Net Gain Coefficient", "Interaction Length", and "Mode Order Number" used throughout this specification as applied to quantum amplifiers. If pumping light energy is allowed to propagate in an amplifier structure having an infinite length as a bound mode of the structure, effecting stimulation of laser material, a gain condition for signal light energy propagating in the amplifier is set up wherein the gain factor is highest at the entry end and becomes infinitesimally small at infinite length. The Net Gain Coefficient (NGC) associated with a given signal mode propagating in such amplifier is the theoretical gain that will be obtained if such signal mode is allowed to propagate to infinity together with the pumping light energy. Accordingly, the NGC achieved in a quantum amplifier will be largely dependent on the order number of the pump mode and the order number of the signal mode or modes. The Interaction Length (IL) for a given combination of pump and signal mode order numbers in a particular amplifier may be defined as that length of amplifier which is required for the signal mode intensity to increase by one-half of the ultimate intensity increase that would pertain if it were allowed to propagate to infinity.

In any given dielectric waveguiding structure light beam energy can propagate only in specific angular directions with respect to the axis, such that no reflection exceeds the critical angle at a waveguide internal surface. At any cross-section of the waveguide, for unidirectonal propagation, the amplitude distribution is determined by the geometry and the particular angular relationship of the beam to the axis, and will be characterized by specific patterns as may be represented in Cartesian or Polar coordinate systems. Considering a slab waveguide in which the transverse electric (TE) or transverse magnetic (TM) mode of wave energy is propagating, the subscripts ($TE_n$) and ($TM_q$) are used to numerically designate the order number of the mode. For a rectangular slab waveguide the lowest order number assigned is zero, for either mode, and is associated with a beam making the smallest angle between its propagation direction in the waveguide and the waveguide axis, for which the plot of amplitude in a Cartesian axis system defining a cross section normal to the waveguide axis exhibits a gaussian-like shape, with no transitions through the abscissa (reversals of sign) hence '$n$' and '$q$' are zero. The next higher order number ($TE_1$ or $TM_1$) is assigned to bound energy propagating at the next larger allowed angle, the amplitude plot of which exhibits a single transition through the abscissa axis. Similarly, energy designated $TE_9$, for example, would be characterized by nine zero amplitude positions, and is referred to as the transverse electric mode of ninth order. Depending on refractive index differences across a waveguide boundary, and on waveguide dimensions, there is an order number above which a beam cannot propagate.

For cylindrical waveguides the TE and TM modes of propagation of light wave energy have two numerical order numbers designating amplitude zero values in a Polar coordinate system for both polar parameters, i.e. polar angle and radius distance. For example, a cylindrical waveguide a few microns in diameter may support only the $HE_{1,1}$ mode of order number ($_{1,1}$). The importance of the order number of a mode in the present invention from the fact that for a given transverse waveguide dimension the number of internal reflections per unit of length increases as the order number rises and hence is an important factor in determining NGC and IL of a quantum amplifier.

For a comprehensive treatment of the subject, further reference should be made to the textbook *R. E. COLLINS* — "Field Theory of Guided Waves", McGraw-Hill, New York (1960).

The penetration of the evanescent wave component of a totally internally reflected light beam into the cladding of the wave-guiding dielectric body is greatest for the highest mode order number, consequently the degree of interaction between the signal and pumping light beams is enhanced in the contiguous zone of the cladding laser material when the mode order numbers are suitably chosen. For example, in a waveguiding fibre dielectric body of small radius that supports only a single mode of propagation — the $HE_{1,1}$ mode — high efficiency of interaction will result when both the signal and pump modes of propagation are $HE_{1,1}$ modes. In the case of a fibre of sufficient radius which supports nine modes and if both the signal energy and the pumping energy propagate in the highest (ninth) mode order numbers, maximum interaction will occur. For each dielectric waveguiding structure that may be selected for the quantum amplifier, maximum interaction is desirable because the length of the quantum amplifier is thereby minimized while maintaining a high NGC. A more detailed discussion of the nature of energy exchange between evanescent wave components of two light beams propagating in a passive core having a cladding of laser material will be found in the group of papers: "Amplification of Light in an Optical Waveguiding Structure With Evanescent-Wave Pumping", *Canadian Journal of Physics* 1973, by A. Watanabe, K. O. Hill, and R. I. MacDonald; "Evanescent-Wave Interactions in an Optical Waveguiding Structure", *Applied Optics* Vol. 11, page 1952, Sept. 1972, by K. O. Hill, A. Watanabe and J. G. Chambers;

While the mathematical investigations on which the conclusions presented in the foregoing papers are based relate to symmetric slab waveguiding structures comprised of a passive slab core with an active cladding of laser material on a smooth surface thereof, the findings are also valid for fibre optic waveguides, i.e. smooth elongate cylindrical dielectric bodies of small constant radius.

According to a preferred embodiment of the present invention, the mode order numbers of both the signal light beam and of the pumping light beam incident on the entry end of the quantum amplifier are selected for optimum interaction efficiencies, by passing one or both beams through field pattern-converting holograms; the amplified signal beam delivered at the output end of the amplifier is further passed through a complementary hologram to convert the beam field pattern to the desired transmission mode for onward propagation in a transmission fibre optic. In conventional transmission systems using such fibre optic waveguide the signal light beam is transmitted in a lower order mode for which the attenuation in the dielectric is lowest, for example in the $HE_{1,1}$ mode. It is therefore necessary to utilize a mode-conversion device in order to convert the signal light beam from such low order number transmission mode into the desired high mode order number providing the shortest IL and the greatest NGC of the amplifier. Investigations made with both dielectric slab waveguides and fibres have shown that the NGC increases in magnitude with the signal mode order number, indicating that the highest possible mode order of the signal light beam should be propagated in the amplifier. On the other hand the NGC is not particularly sensitive to pump mode order number. While in dielectric waveguiding structures exhibiting extremely low passive loss the pump beam can be made to propagate in any mode, glass fibre amplifiers of even the lowest attenuation factors have significant passive loss, hence it is desirable to minimize the interaction length. The interaction length decreases with increasing pump mode order number; consequently the optimum combination of NGC and IL will be realized when the pump and signal light beams propagate in related order modes.

For achieving the objectives and purposes of the present invention, namely to improve greatly the efficiently of converson of electromagnetic wave energy of a pumping beam to amplified signal energy, a novel apparatus is provided comprising a mode-matching hologram through which the signal light beam is passed to convert the low mode order number energy components to a high mode order number suitable for propagation in a quantum amplifier; a lens focussing the mode-converted signal beam on the entry end of a passive glass fibre core of a quantum amplifier; a dichroic mirror interposed in the path of the signal beam transparent to the band of frequencies comprising the beam; a laser oscillator providing an output beam of coherent light of a suitable frequency in a correlated mode order number; a lens converging the output beam on the dichroic mirror for reflection therefrom as a focussed beam incident on the entry end of the quantum amplifier; and an active cladding layer on the surface of the passive core of the amplifier, which layer is absorptive to pumping energy and stimulateable by evanescent-wave components thereof to a level of population inversion, whereby the signal beam energy is intensified at each total internal reflection by interaction of the evanescent-wave component with the optically-pumped region.

DESCRIPTION OF EMBODIMENTS

The invention will next be described with particular reference to a preferred embodiment in conjunction with the accompanying figures of drawing, wherein.

Figure 1:
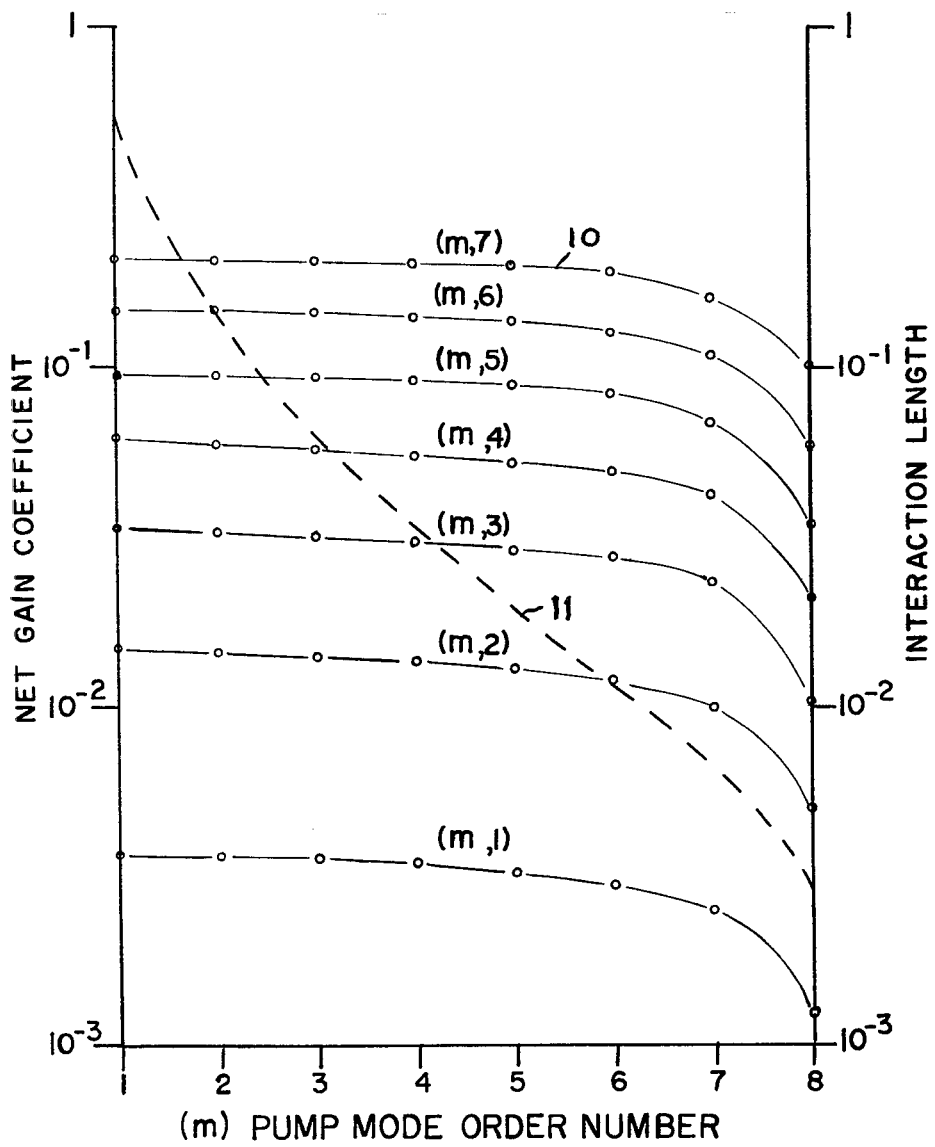
FIG. 1 is a graph relating calculated quantum amplifier parameters with pump mode and signal mode numbers.

Referring to FIG. 1, there are illustrated family relationships of Net Gain Coefficients with respect to Interaction Lengths, computed for a range of mode order numbers 1 through 8 of pumping electromagnetic wave energy interacting with signal light energy of a range of mode order numbers 1 through 7. The starred curves such as 10 define NGC ordinate values to logarithmic scale expressed in units per centimeter of quantum amplifier length, for the numbered signal mode order interacting with the pumping energy modes numbered on the abscissa axis. The family of points designated by triangles along dashed curve line 11 define IL ordinate values also to a logarithmic scale, expressed in meters length. It is to be noted that lines 10, 11 have no validity for absciss values other than integer numbers.

The graphical relationships were calculated for a waveguiding structure in the form of a dielectric slab of thickness 5 microns and an index difference between slab and cladding laser material of 0.06, but is illustrative also of trends of NGC and IL parameters for fibre optics. The slab dielectric body is capable of supporting eight pump mode orders and seven signal mode orders, the frequencies being, respectively, $\omega$ pump: $3.19 \times 10^{15}.\text{sec}^{-1}$
$\omega$ signal: $2.99 \times 10^{15}.\text{sec}^{-1}$.

From the diagram it will be seen that for any given pump mode order number the NGC increases with the signal mode order number and is greatest for the seventh mode order number in combination with a low pump mode order number. However, it will be also evident that the NGC values remain relatively constant for all pump mode order numbers up to the seventh. The shortest IL values are achieved with any signal mode order combined with the highest (eighth) pump mode order. As an illustrative example, in choosing the respective mode order numbers to be associated in a particular quantum amplifier, let it be assumed that an NGC larger than $10^{-1}$ is desired, and an IL less than $2\times10^{-1}$ is also desired. Such amplifier is required therefore to operate with a pump mode order number "$m$" equal to 1, and with a signal mode order number 7.

Figure 2:
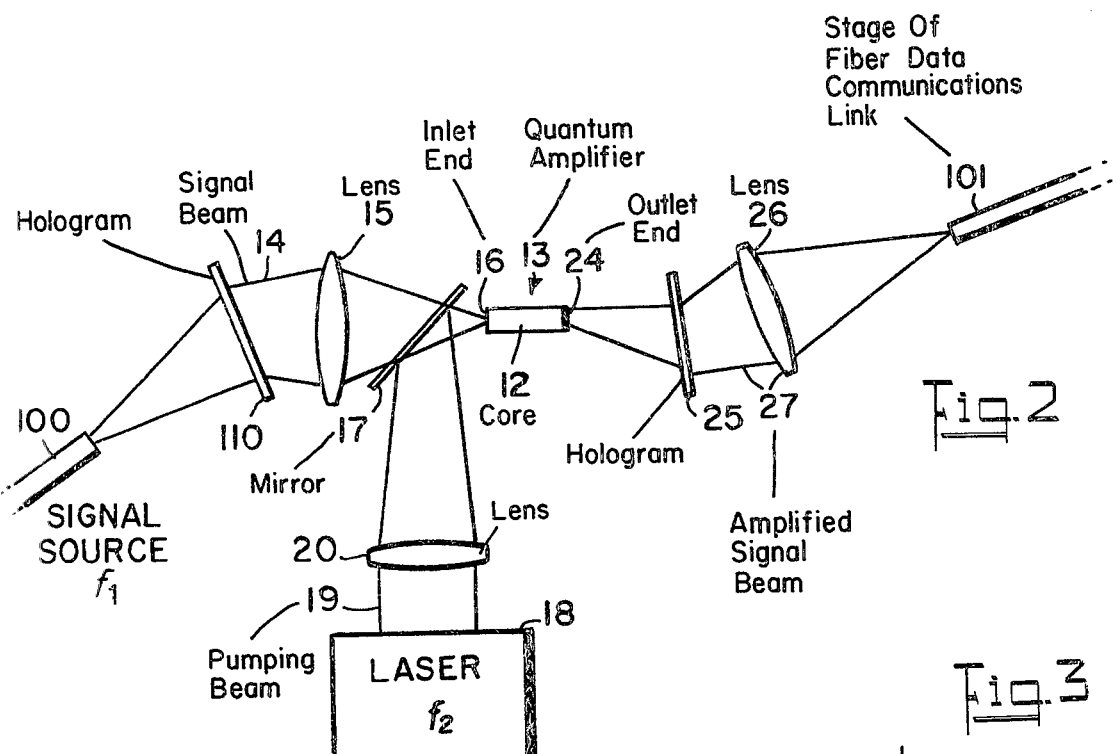
FIG. 2 is a schematic diagram illustrating an ultra-wide band quantum amplifier employing a passive fibre core.

An ultra-wide-band amplifier according to the invention is depicted in FIG. 2 in longitudinal section, comprising a source 100 of a signal light beam carrying information, which source may be a glass fibre, the beam having a center frequency $f_1$ such as 10,600 A wavelength where the source is a yttrium aluminum garnet laser doped with neodymium ions, although any other suitable source may be employed. The light beam issuing from the end of fibre 100 is incident on a hologram 110 which may be any suitable optical device or system capable of converting certain low-order electromagnetic modes of the light waves to desired modes or a single mode particularly efficient when propagating through the core 12 of the amplifier component generally designated 13. A preferred structure is described at a later point. The converted signal light beam represented by the beam outline 14 strikes a lens 15, at the focus of which the source 100 is imaged on the end 16 of the passive glass core 12, the diameter of which is a few microns, for entry at predetermined angles with respect to the core axis such that the light beam is propagated by total internal reflection along the core with angles of incidence approaching the critical angle.

The focussed beam passes with negligible attenuation through the dichroic mirror 17, the front surface of which however is highly reflecting to pumping energy at frequency $f_2$ generated by source 18 designated LASER. The latter may be an argon-ion laser operating at a wavelength of 5145 A delivering a coherent beam represented by outline 19. The pumping beam is passed through lens 20 and focussed on the entry end surface 16 of the glass fibre core, the average angle between its propagation direction and the axis of the fibre being such that when the light propagates along the core by multiple total internal reflections, negligible energy escapes. If desired, the pumping light may be passed through a mode-conversion device similar to 110 (not shown).

Figure 3:
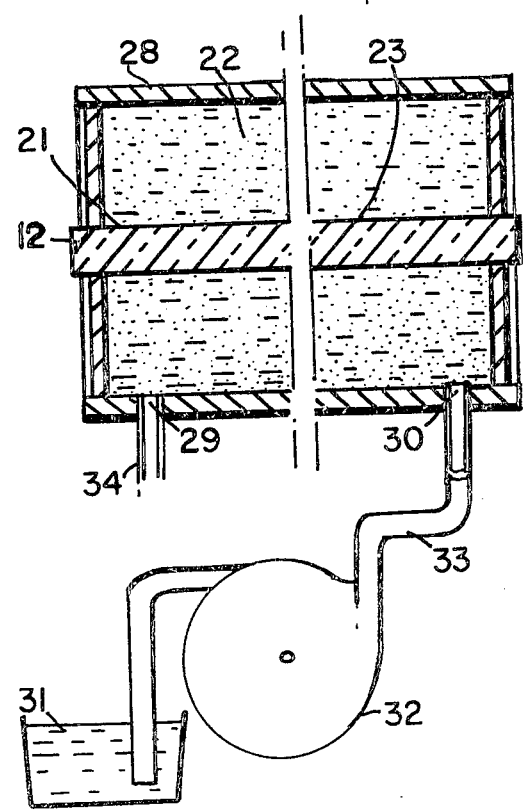
FIG. 3 is a greatly enlarged axial diametral section of the amplifier comprising a passive glass core and active film.

Referring also to FIG. 3, the signal energy and the pumping energy propagate together along the fibre element 12, experiencing repeated reflections from the interface 21 between the glass fibre and an intimate cladding layer 22 wetting the glass surface. The layer comprises a liquid film of an active medium at least thick enough to be continuous. The active medium may be any material capable of absorbing energy from the pumping beam, thereby having its ion population excited to a higher level, and of delivering the energy of stimulation to the signal beam. Because the cladding layer 22 has a lower index of refraction than the glass core, evanescent-wave components of both beams penetrate the active medium when undergoing total internal reflection, the maximum depth to which significant energy penetrates not exceeding a few half-wavelengths of the respective frequencies, and for purposes of visualization being indicated as a zone 23. The dimensions in the drawing are disproportionately large for purposes of illustration, and in fact no defininte limit of penetration can be assigned.

The signal energy issuing from the exit end 24 of the fibre 12 is directed upon a further mode-converting hologram 25, which in turn directs converted signal energy upon lens 26. The amplified signal beam 27 is focussed to enter a succeeding stage 101 of the fibre data communications link, or may be distributed in any suitable manner to utilization components.

The active medium may be any film-forming substance which exhibits the desired capability of being stimulateable to a higher excitation level of its ion population by the penetrating pumping light, and of interacting with a similarly penetrating signal energy beam of a different frequency to amplify the signal. Such interacton requires that the spontaneously emitted energy of the active medium, i.e. the band of fluorescent wavelengths, be closely related to the signal energy wavelength. Ideally the center of the band of fluorescent wavelengths should coincide with the signal wavelengths, but may be offset by a fraction of the spectral width of the fluorescence band.

Materials may be used which have a liquid phase at an elevated temperature, permitting their application as a cladding layer to a core, and which are solid at ambient temperatures. However, bleaching and heat degradation of such medium by high energy pumping beams limits solid media to relatively low power systems. Liquid film-forming substances capable of being flowed along the exterior surface of the fibre are preferred, to facilitate replenishment and replacement, in amplifiers utilizing extremely high power pumping beams. The preferred active medium is for example an organic dye solution of high boiling point of a $Nd^{+3}$-doped compound. As vehicles there may be used substances including various glasses, plastics, certain semiconducting materials, and fluids such as alcohols or other compatible organic solvents.

Where high power laser source 18 provides such intensity of pumping light as to tend to bleach the active medium within the penetrated zone 23, the removal of degraded material by flowing liquid replacement may be accomplished as shown in FIG. 3 by jacketing the amplifier 13 with the cylindrical tube 28 surrounding layer 22, and providing outlet and inlet ports 29 and 30, respectively, for continuously passing fresh solution from source 31 as by pump 32 and delivery and waste lines 33 and 34, respectively. Spent medium may be rejected, inasmuch as an extremely small volume of medium is required over a period extending several months.

Figure 4:
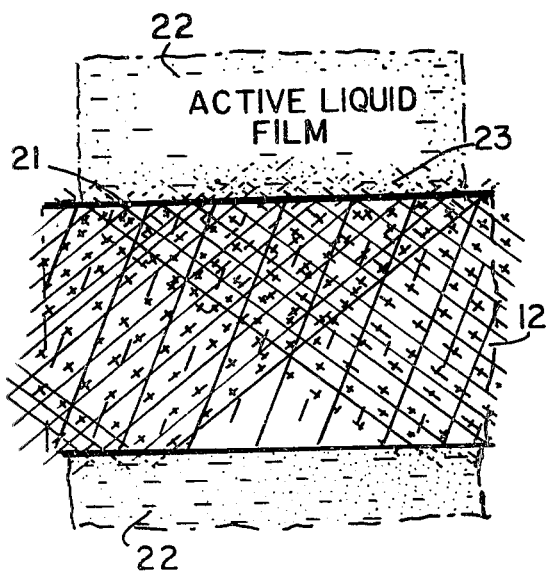
FIG. 4 is a cross-sectional illustration in further enlarged scale representing interaction of evanescent-wave components of pumping beam and signal beam energies in a contiguous portion of the active film.

Referring to FIG. 4, a section of the glass fibre core and the cladding layer 22 is shown in greatly magnified scale representation, in which the interaction of pumping beam energy, shown propagating as a group of rays denoted by + + + + marks, with the co-propagating signal beam energy shown as a grop of rays denoted by solid parallel lines, occurs within the contiguous zone 23. At the interface 21 within the narrow zone 23 the signal light experiences reflection, such that the intensity of the rays reflected from portions of the zone relatively near the interface is the highest, and the intensity diminishes as a non-linear (exponential) function of depth. Due to interaction of signal light with the stimulated layer the reflected energy for a given depth is of higher intensity than the incident light penetrating to that depth. Augmented reflected signal light also issues from reflection sites as deep as several half-wavelengths beyond interface 21, although the contribution to the amplifying action may be considered inconsequential at depths beyond about 0.6 wavelength.

The pumping energy similarly undergoes distributed reflection within the contiguous zone 23, being attenuated by absorption as a function of distance travelled within the active medium. The irradiated portion of layer 22 generally coincides with the portion which is traversed by light of both signal and pumping frequencies, provided that the propagation mode order numbers of both signal and pumping beams are suitably chosen. Consequently the extremely thin cylindrical shell immediately contiguous to the interface 21 is effective to impart energy to the signal beam and hence to amplify the signal, while the energy of the pumping beam is attenuated exponentially with axial distance along the fibre due to absorption within such shell. After a certain axial length has been traversed, the intensity of the pumping beam will have diminished to a relatively ineffectual level and effective gain of signal energy becomes insignificant.

Figure 5:
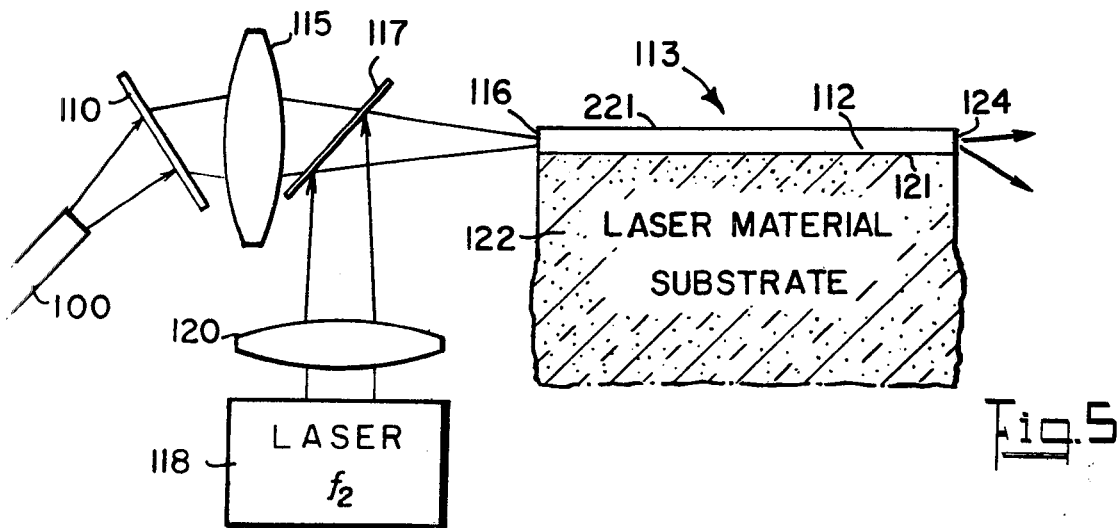
FIG. 5 shows a quantum amplifier comprised of a passive sheet supported by a substrate of laser material.

In an alternative embodiment of the invention illustrated in FIG. 5, a quantum amplifier generally designated 113 comprises a passive dielectric core body 112 in the form of an optically flat parallel-sided slab, the width of which (the dimension in a direction normal to the plane of the sheet) may be large, as compared with the diameter of the fibre core previously described. The incident signal light beam is focussed by means of lens 115, which may be cylindrical, on entry face 116, to propagate longitudinally within the thin sheet slab body as a bound mode of the structure. Pumping light from laser source 118 is also focussed, by lens 120 and reflection from a surface of dichroic mirror 117, to propagate along the slab also as a bound mode, preferably of specific mode order number or numbers.

The extremely thin slab body 112 is intimately in contact along one surface thereof with a solid substrate 122 comprised of a laser material. The laser material may be a glass, a semi-conductor, or other solid dielectric substance carrying dopants rendering the material capable of absorbing pumping light energy and having the ion population excited to a higher level, i.e. stimulation, and of fluorescing in a band of wavelengths including the band of wavelengths of the signal light energy. The refractive indices of the passive core and the solid laser material substrate must be different, the index of refraction of the sheet slab being greater than the index of refraction of the laser material. The signal light is amplified at each reflection from the interface 121 while the pumping beam energy is absorbed at the interface, in the manner described previously. The amplified signal light issues from the end face 124.

It is to be noted that the surface 221 of the sheet slab opposite to interface 121 is also an interface between air or vacuum, with refractive index of unity, hence less than the index of refraction of the passive core and active medium. This satisfies the requirement that the passive core have the higher refractive index as compared with the dielectric bodies contiguous to it, and assures the confinement of the light propagating within the passive core, while reflections at interface 221 are essentially lossless for both signal and pumping light.

Figure 5A:
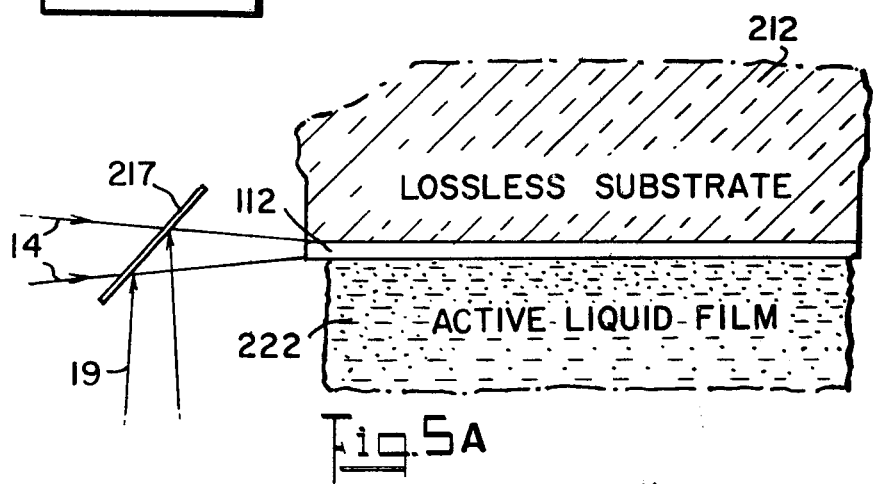
FIG. 5A shows a sheet slab, passive substrate, and active film.

While the embodiment of FIG. 5 may be operated at moderate power levels of pumping light, the heat flow through the substrate 122 limits the amplifier power capability. For the highest operating levels the amplifier of FIG. 5a is preferred. The passive sheet slab 112 of this embodiment is supported by a low loss dielectric substrate 212, which may be a glass transparent to signal light and pumping light, having a refractive index which is low with respect to the index of the passive core sheet slab. As active medium there is intimately adhered to that side of the slab opposite to substrate 212, an active medium of liquid form, such as a dye laser medium, having a refractive index intermediate the indices of substrate 212 and passive core 112. When signal light and pumping light are propagated along the passive core in the same manner as described for FIG. 5, amplification of signal light is effected by interaction of the evanescent-wave component of the signal light with the optically pumped zone of the liquid laser medium 222 contiguous to interface 221. Provision is made for removing spent liquid as it becomes degraded, i.e. bleached, under the effects of high power pumping light, by any suitable means such as that described for FIG. 3.

In the quantum amplifiers described the diameter of the passive fibre core, or the thickness of the slab core, will be chosen to lie in the range from about 1 micron to about 50 microns, a preferred fibre diameter being about 3 microns. The axial length will be chosen in accordance with IL determinations, so that nearly all or virtually all of the input pumping light energy is absorbed in the active medium, while at the same time the amplifier should not be excessively long causing the signal beam to propagate without experiencing gain. Suitable lengths will lie between about 0.1 and 1000 millimeters or longer.

Because the optical frequencies of the respective beams are widely different, and since the critical angles at the interface with the active medium will generally also be unequal, it is critically important to launch the respective beams at carefully selected angles, employing positioning means and adjusting devices of a very precise character.

It has been pointed out that for highest efficiency the mode order number in which the pump beam propagates should be correlated with the order number of the signal mode selected in accordance with FIG. 1. Hologram devices as will next be described with reference to FIGS. 6 and 7 may be employed for converting either energy to the desired mode order number.

Figure 6:
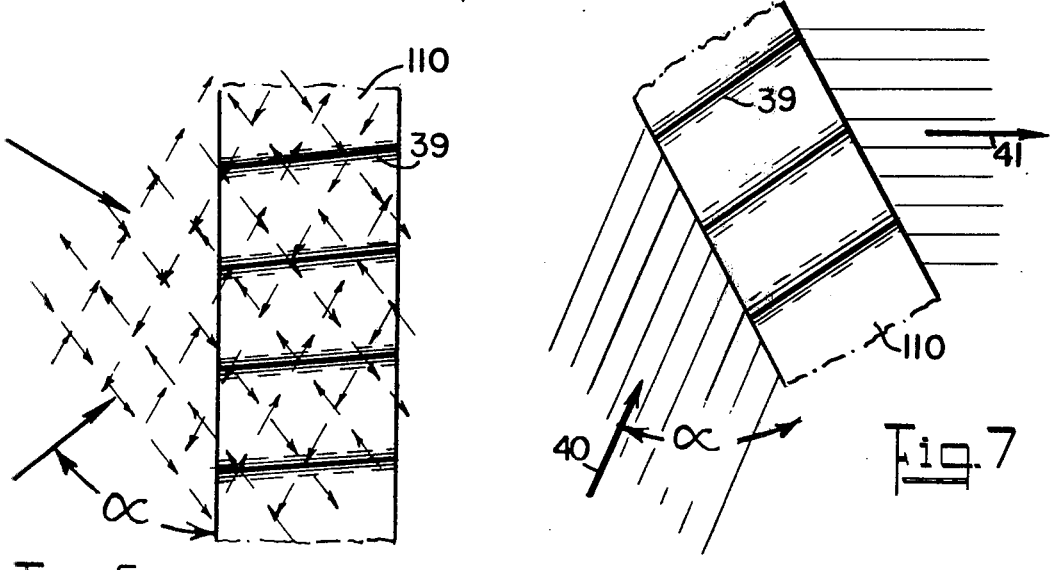
FIG. 6 is a diagram showing fabrication of a hologram.

For example, the conversion of the field pattern of signal light received from the transmission fibre 100 in FIG. 2 to the appropriate mode order number, such as $(_{7,7})$ for launching as a bound mode of the fibre core 12 may be accomplished by interposing a hologram 110 in the path of the signal light, at predetermined angles to the beam direction. The hologram consists of a planar body having a thickness of at least a few wave-lengths and may be from about 0.5 to 100 microns thick. As materials there may be used a suitable plastic, glass, or other material capable of being spatially modulated as to selected propagation characteristics, namely amplitude and phase characteristics of transmission. The planar body 110 may be manufactured by known mechanical, photographic, or electronic recording and/or forming processes. For the specific requirements of the present invention, it is perhaps most easily produced by using a photosensitive material whose refractive index or amplitude transmittance characteristic can be precisely controlled by exposing the material to electromagnetic wave energy of predetermined properties (wavelength, incidence angle, coherence, and polarization) as in the manner of a holographic recording. In producing the required hologram for achieving modeconversion, it is necessary to employ light having the predetermined field distribution specific to the wavefront, frequency and phase characteristics of the hologram recording plane in conjunction with the conjugate wave-field of that field. Both wave fields must be coherent, one with the other, and when they are so related and when jointly directed upon the hologram body 110 so as to form a spatial interference pattern in the plane occupied by the sensitive medium, as shown in FIG. 6 the desired hologram will be recorded. The processing of the exposed photosensitive medium provides a permanent record of the interference pattern, represented by the density pattern 39.

When the hologram produced as described is illuminated with light designated by ray group 40 having the same field distribution as the wave field which was employed in recording the hologram, the recorded pattern modulates the field distribution of the incident light in such a way that the issuing light designated by ray group 41 is of the desired wave field. Holographic recording materials at the present time enable holograms to be produced which will perform the wavefront shaping operation described with high efficiency.

Figure 7:
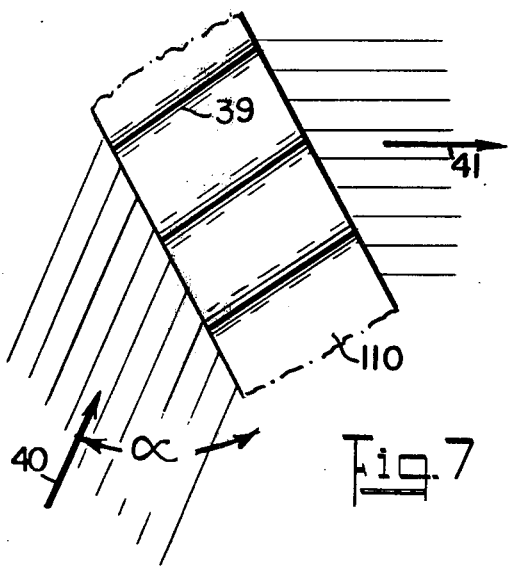
FIG. 7 is a diagram illustrating mode conversion of a light beam by means of an interposed hologram as in FIG. 6.

By interposing the hologram body 110 as shown in FIG. 7 in the path of light designated by ray group 40, denoting light received from the transmission link 100, in such orientation that the signal light is incident at the angle $\alpha$ the density pattern of the hologram recording converts the field pattern to one which when launched into the passive dielectric waveguiding structure of the quantum amplifier 13 will cause the light to propagate therein as a bound mode of the desired mode order number.

Reverting again to FIG. 2 and FIGS. 5 and 5a, lasers 18 or 118 have for simplicity been referred to as emitting coherent light of frequency $f_2$ without qualification as to field distribution. Since the NGC and IL factors are not as critically dependent on pump propagation mode order number as on signal mode order number, the output of such laser may be expected to generally be effective for optically pumping the cladding layer such as 22, 122, or 222. However, for achieving the ultimate NGC factor and the least IL a mode-matching hologram produced by the method outlined hereinabove may be interposed between the laser source and the lens 20 or 120, of such characteristics that it corrects any undesirable wave-front aberrations of the laser beam issuing from the laser.

We claim:
1. Apparatus for amplifying signal light energy of a first given band of wavelengths, comprising
   a. an elongated dielectric waveguide structure having an entry face and an opposed exit face;
   b. a source of coherent laser light pumping energy of a second band of different wavelengths; and
   c. means including a dichroic mirror for directing said signal light energy and a beam of said coherent laser light pumping energy simultaneously into said entry face, said means for directing said signal light energy further including
      1. a mode-converting volume hologram (110) having a spatial interference pattern recorded throughout the volume of the holographic medium such that signal light energy having a first predetermined wave front distribution incident thereon is transmitted through said hologram and converted to a desired mode order number by internal reflection from said interference pattern into a second predetermined wave front distribution, and 2. a first optical lens (15) for focusing the light transmitted by said volume hologram into the entry face of said waveguide structure to launch said signal light energy for propagation along said waveguide structure as a predetermined higher order number mode of said waveguide;

d. said waveguide structure including
  1. a passive dielectric core having low absorption to said given bands of wavelengths, said core having a smooth continuous side wall portion throughout the length thereof, and
  2. a cladding of a laser material intimately adhered on said side wall portion,
     a. said cladding having an index of refraction lower than the index of refraction of said core and confining the signal and pumping energies propagating along said core as bound modes of the structure,
     b. said cladding including an active medium capable of being optically pumped by ion coupling with evanescent-wave components of said laser light pumping energy and capable of interacting with evanescent-wave components of signal light propagating along said core and being stimulated to fluoresce in said first given band of wavelengths, whereby to amplify said signal light.

2. Apparatus as defined in claim 1, and further including
  e. an output optical transmission line (101);
  f. second hologram means (25) arranged between the waveguide structure exit face and said output line, said second hologram means comprising a volume hologram having an interference pattern such that when amplified signal light energy issuing from said exit face having a third predetermined wavefront distribution is incident on said second hologram means, said amplified light enrgy is transmitted through said second hologram means and is converted to a predetermined lower order number mode by internal reflection from said interference pattern into a fourth predetermined wave front distribution; and
  g. second optical lens means (26) for focusing the amplified light energy upon said output line for propagation therealong as said predetermined lower order number mode.

3. Apparatus for amplifying signal light energy as defined in claim 2, wherein said pumping light energy is of longer wavelength than said signal light energy and is directed into said entry face.

4. Apparatus for amplifying signal light energy as defined in claim 3, wherein said signal light energy is the radiation output lobe of a fiber optic waveguide transmission line, and further wherein said output transmission line is also a fiber optic waveguide.

* * * * *